United States Patent Office 3,578,576
Patented May 11, 1971

3,578,576
POLYPEPTIDE SYNTHESIS FROM AMMONIA AND METHANE USING HIGH ENERGY RADIATION
Robert M. Kliss, Marblehead, Mass., and Clifford N. Matthews and Robert E. Moser, St. Louis, Mo., assignors to Monsanto Company, St. Louis, Mo.
No Drawing. Filed Apr. 25, 1967, Ser. No. 641,723
Int. Cl. B01j 1/10
U.S. Cl. 204—162        7 Claims

ABSTRACT OF THE DISCLOSURE

A process for synthesis of polypeptides by subjecting ammonia and methane to high energy radiation and then treating the resulting product with water.

BACKGROUND OF THE INVENTION

A widely-held view stimulated by speculations on how proteins were formed on Earth before the appearance of life is that the formation of polypeptides occurred originally via two essential steps, $\alpha$-amino acid synthesis initiated by the action of natural high energy sources on the components of a reducing atmosphere, followed by polycondensations in the oceans or on land. The results of a dozen years of simulation experiments appear to support this view.

Experiments in which high energy radiations were applied to reduced mixtures of gases have yielded many of the twenty $\alpha$-amino acids commonly found in proteins. The pioneering research of Miller, S. L., J. Am. Chem. Soc. 77, 2351 (1955) showed that glycine, alanine, aspartic acid and glutamic acid were among the products obtained by passing electric discharges through a refluxing mixture of hydrogen, methane, ammonia and water. Extensions of these studies by Abelson, P. H., Science, 124, 935 (1956), and others showed that $\alpha$-amino acid synthesis could be effected by almost any source of high energy so long as the starting mixture contained water and was reducing. Since mechanism studies by Miller indicated that aldehydes and hydrogen cyanide were transient intermediates during the course of the reaction, it was concluded that the $\alpha$-amino acids were formed by the well-known Strecker route involving hydrolysis of aminoacetonitriles arising from the interactions of aldehydes, hydrogen cyanide and ammonia.

Another type of research carried out in the context of chemical evolution studies has shown that peptides and polypeptides can be directly synthesized from $\alpha$-amino acids under certain specified conditions. In aqueous ammonia solutions it has been found that up to eighteen glycine molecules could be linked together. Glycine precursors such as aminoacetonitrile could also be converted to small peptides in aqueous reactions or by heating with clay. In another approach, condensing agents that could have been present in primordial times were used. The simplest method of all was discovered by Fox S. W., Science, 132, 22 (1960), and coworkers who isolated polymers of high molecular weight (up to 300,000) after heating mixtures of $\alpha$-amino acids to 180° C. under anhydrous conditions, lower temperatures being permissible when polyphosphoric acid was used as a solvent.

From these studies, then, it appears to be well established that $\alpha$-amino acids could and would have been synthesized readily in the reducing environment of primitive earth. Less well understood is the polymerization step. The specialized conditions demanded by the apparently successful model experiments do not have universal appeal since anhydrous locales, high temperature surface milieu, and acidic oceans or pools are not characteristic of a young and developing planet. In spite of these uncertainties, it is still commonly held that condensations must have occurred, perhaps under conditions similar to those of one of the experiments so far described.

SUMMARY OF THE INVENTION

It has now been found notwithstanding the above-noted theories and experiments that polypeptides can be directly prepared from methane, ammonia and water without the intervening formation of $\alpha$-amino acids.

In accordance with this invention there is provided a method for making peptides by first subjecting a gaseous mixture of methane and ammonia to a source of high energy radiation and then treating the resulting product with water.

DESCRIPTION OF THE PREFERRED EMBODIMENTS

Any available high energy source capable of converting methane and amonia to hydrogen cyanide can be used, preferred sources being high voltage electric discharges greater than 6 electron volts and ultraviolet light of wavelength less than 2000 A. (angstrom units).

Methane and ammonia are employed in substantially equal volumes although an excess of either is satisfactory. Preferably the excess will not exceed about 100 percent (by volume).

Since the reaction mixture is to be maintained in the vapor phase, initial pressures and temperatures of the reactants will be adjusted accordingly. In general, each of the reactants is gaseous at room temperature at atmospheric pressure. Advantageously the temperature will be from about room temperature (20° C.) to about 100° C. Since higher temperatures can be used if the condensed products of the reaction can be collected at temperatures below 100° C. to prevent degradation, the process can be carried out at temperatures from about zero to about 300° C. The pressure may vary, from subatmospheric to superatmospheric pressure, provided that it is such as to maintain the reactant mixture in the vapor phase. For example it may be as low as 5 mm. of mercury or it may be as high as about 100 atmospheres. In general pressures between about 500 mm. of mercury vacuum and about 2 to 3 atmospheres pressure are preferred.

To effect irradiation of the anhydrous vapor phase reactant mixture, energizing radiation sufficient to form hydrogen cyanide will be employed. High intensity photochemical light sources generating monochromatic or polychromatic radiation of wavelength less than 2000 A. may be used. For example, light sources employed may be a mercury arc produced in a low pressure discharge, a low pressure high potential discharge through hydrogen, sparks between aluminum electrodes, noble gas resonance lamps and the like. Additionally, use may be made of high energy radiations such as X-ray radiation; microwave discharges; radiations from plasmas, arcs and sparks; radioactive radiation including alpha, beta, and gamma rays; neutron bombardment and so forth.

The intensity of the radiation source to which the reaction mixture is exposed will determine the time of exposure necessary to effect reaction. In general, a rather slow circulation (low flow rate) will be desirable. The method may be practiced as a batch process, or a continuous process. In the continuous process the gaseous reactants are recycled through the radiation source, a very satisfactory time cycle being between 24 and 72 hours.

Variation of side groups of the polypeptide can be effected by carrying out the first step in the presence of compounds that yield free radicals when energized e.g. alkyl or aralkyl hydrocarbons, and then treating the products with water. Alkyl hydrocarbons having from about two to twelve carbon atoms and aralkyl hydrocarbons having from about seven to eighteen carbon atoms are suitable.

At appropriate temperatures and pressures, the monomeric and polymeric protein precursors formed under the stated reaction conditions will be liquids or solids, as distinguished from the gaseous reactants employed in conducting the reaction. Accordingly a separation of the products from the reactants can be accomplished by the usual means for separating gaseous from admixed solid and liquid material. For example, condensing products may be removed continuously from the reactor while the remainder of the gaseous mixture is recycled. The condensed products may then be further separated by the use of standard chromatographic techniques.

The examples below are intended to further illustrate the workings of this invention and in no manner are to be construed as limiting the invention except as set forth in the claims appended hereto and the specification. Unless otherwise specified all temperatures are in degrees centigrade and all parts are by weight.

In accord with the proposal model, water was rigorously excluded as a reactant in order to simplify the reaction mixture, maximize the possibility of vapor phase polymerization and demonstrate that oxygenated species such as aldehydes are not essential synthetic intermediates. In working up reaction products, mild hydrolysis conditions were used to convert any imino groups to carbonyl groups and yet not cleave peptide bonds. The resulting peptides were then isolated from the other solid products by standard filtration and chromatographic techniques.

EXAMPLE 1

In electric discharge experiments several types and sizes of apparatus constructed from Pyrex glass were used. With a cycle apparatus, similar in principle to the reactors used by Miller and others, gas mixtures were continuously circulated by thermal diffusion so that volatile reaction products passed repeatedly through the spark between two tungsten electrodes. With a flow apparatus the gases passed through a capillary leading into the spark area and then passed out of the system, nonvolatile products being condensed in U-tubes and volatile products in cold traps. Since essentially the same kinds of products were obtained in a variety of experiments, we shall describe a typical 60 hr. run conducted in a 5-liter capacity cycle apparatus. The thoroughly cleaned chamber was flushed with methane and ammonia and then filled to a pressure of 500 mm. with a 1:1 (v./v.) mixture of methane (Matheson research grade, 99.99% purity) and ammonia (Matheson, anhydrous) that had been passed through a column of anhydrous sodium hydroxide pellets. The spark was ignited (Jefferson transformer No. 721–111, 15,000 volts), causing slight warming in the electrode region of the chamber which otherwise was maintained at room temperature. The first observed products from methane-ammonia breakdown were yellow to brown droplets on the walls near the spark. In parallel experiments, the oils were removed by solvent extraction and shown by their infrared spectra to be mixtures of compounds containing amine, imine, nitrile and hydrocarbon groups. Volatile products withdrawn after 24 hrs. and analyzed by combined VPC and mass spectrometric techniques consisted mainly of hydrogen, nitrogen and hydrogen cyanide, with smaller amounts of methane, ethane and ethylene. At an earlier stage, acetylene was also detected. Non-volatile reaction products were allowed to accumulate for up to 60 hrs. when nearly all of the methane had been consumed. By this time the oil had taken on the appearance of a black viscous tar and the inside wall of the chamber had become coated with a brown film.

With the reaction completed, the vessel was purged with dry nitrogen. The residues were washed out into 50 ml. of cold 0.1 N HCl and heated at 100° C. for 30 min. The resulting mixture was divided into two fractions (A and B), both consisting of black solids and a dark solution. The concentration of acid in fraction A was brought to 6 N by the addition of hydrochloric acid and the mixture was heated to 100° C. for 24 hrs. to effect complete hydrolysis of any peptide-like materials. The hydrolysate was evaporated to dryness in vacuo at 70° C. α-Amino acid products were isolated by two-step ion-exchange chromatography on amino acid-free Dowex 50W (8X, 50–100 mesh, H+ form) and Dowex 2 (8X, 50–100 mesh, OH− form) resins and then analyzed on a Beckman Amino Acid Analyzer (model 120B), see Stevens, F. S., et al., Biochem. J., 83, 245 (1962). Positively identified were lysine, histidine, aspartic acid, threonine, serine, glycine, alanine, and isoleucine. (Table 1, column 1.)

Three methods of analysis were used to obtain evidence for the presence of peptides, viz thin layer chromatographic (TLC) separations followed by ninhydrin treatment, described in New Biochemical Separations, A. T. James and L. J. Morris (eds.), (London: Van Nostrand 1964), p. 123; analysis by a Technicon AutoAnalyzer method of Catravas, G., Anal. Chem., 36, 1146 (1964); and dinitrophenylation (DNP) using techniques of Sanger, F., Biochem. J., 39, 507 (1945); 45, 563 (1949) and Peranio, C., et al., Anal. Chem., 33, 1863 (1961). In the TLC separations five solvent systems were employed which will be referred to by numbers: TLC I, 4:1=ethanol:34% ammonium hydroxide (v./v.); TLC II, 4:1:1=n-butanol:acetic acid:water (v./v.); TLC III, 140:60:1—ethanol:water:58% ammonium hydroxide (v./v.); TLC IV, 70:25:15:2—methyl ethyl ketone:water: pyridine:acetic acid (v./v.); TLC V, 70:30:3=chloroform:benzyl alcohol:acetic acid (v./v.). Hydrolyses were carried out in sealed Pyrex ampules under nitrogen. Silica gel chromatogram plates (Eastman) were used in all TLC analyses and were developed in the Eastman apparatus.

Fraction B of the mild hydrolysis product was first partially purified by treatment with acid-washed decolorizing charcoal (Baker and Adamson) which was independently found not to alter the composition of dilute acid solutions of several α-amino acids and peptides. TLC analysis of the filtrate on non-fluorescent plates (solvent TLC IV) showed five ninhydrin-active spots, their colors (purple, rust, blue-green) suggesting the presence of peptides. The remainder of the filtrate was freeze-dried to a mixture of NH₄Cl and organic compounds. A portion of the freeze-dried residue was analyzed for peptides in the Technicon AutoAnalyzer which compares the intensities of ninhydrin-complex absorptions of hydrolyzed and unhydrolyzed components eluted from an ion-exchange column. At least six possible peptidic components were present in the sample. Strong hydrolysis of a second portion (0.05 gm.) of the freeze-dried residue in 6 N HCl at 100° C. for 24 hrs. and evaporation of the solvent in vacuo gave a white solid (0.06 gm.) which was mechanically analyzed for α-amino acids. Essentially the same α-amino acids were obtained (Table 1, Column 2) as in the hydrolysis of the crude reaction product. A third portion of the peptidic residue (0.10 gm.) was treated with fluorodinitrobenzene (FDNB), the derivatives then being separated into three fractions by selective solvent extraction. If α-amino acids and peptides had been present, DNP-amino acids would have collected into ether, DNP-derivatives of small peptides and basic amino acids into n-butanol-ethyl acetate (1:1, v./v.) and DNP-derivatives of larger peptides into the aqueous phase. Portions of each of the three DNP-derivative solutions were evaporated to dryness and the residues were hydrolyzed in 6 N HCl at 100° C. for 24 hrs. TLC analysis of the hydrolysates of the ethereal and butanol-ethyl acetate fractions indicated that no α-amino acids had formed upon hydrolysis. By contrast, the developed chromatogram of the aqueous fraction hydrolysate showed a very intense band of ninhydrin-active components, with glycine as the major component of the mixture. Further treatment of the hydrolysate with FDNB followed by TLC analysis of the derivatives allowed the positive identification of DNP-glycine, -isoleucine, -serine, and -aspartic acid in the mixture.

EXAMPLE 2

Further evidence for peptide formation was obtained from another spark reaction by working-up the brown-black products under conditions resembling those postulated for primitive earth. Instead of employing acid hydrolysis, *distilled water* was added to the material which was then allowed to stand at 25° C. for a week, during which the pH of the suspension changed from 8.8 to 8.5. No α-amino acids were present. After strong hydrolysis of a portion of the dark brown suspension several α-amino acids were detected, glycine being most abundant. Filtering through a fritted disc gave a brown solution which was freeze-dried to yield a pale brown solid. This was fractionated through Sephadex columns using 0.1 N ammonium acetate as the eluent. Fractions were collected automatically and the optical densities at 210 mμ were plotted against the effluent volume. Four peaks were most prominent and the fractions making up each peak were combined and freeze-dried to give a yellow intractable tar and three samples of yellow fluffy solids which must have different molecular weights since separation by gel permeation chromatography is based on size differentiation. The solids show infrared bands which can be assigned to amino (3390 cm.$^{-1}$), cyano (2350 and 2400 cm.$^{-1}$) and carbonyl or imino (1790 cm.$^{-1}$) groups. Technicon AutoAnalyzer results indicate that each of the three solids consists of several peptides. After strong hydrolysis, glycine and seven other α-amino acids were detected. (Table 1, column 3.)

TABLE 1.—α-AMINO ACID CONTENT OF HYDROLYSIS RESIDUES (BECKMAN AMINO ACID ANALYZER)

| Found [1] | $CH_4$-$NH_3$ reaction $10^3$ (micromoles) [2] | | |
|---|---|---|---|
| | 1 | 2 | 3 |
| Component: | | | |
| Basic: | | | |
| Lys | 13 | 1 | 2 |
| His | 13 | 0.4 | 3 |
| NH₃ | 85 | 1,830 | 2,400 |
| Unknown | | Trace | Trace |
| Neutral: | | | |
| Unknown | Trace | Trace | Trace |
| Asp | 24 | 3 | 28 |
| Unknown | Trace | Trace | |
| Thr | 15 | 3 | 1 |
| Ser | 22 | 2 | 3 |
| Unknown (2) | Trace | | ([3]) |
| Gly | 589 | 130 | 390 |
| Ala | 5 | 1 | 26 |
| Unknown | Trace | Trace | Trace |
| Ileu | 6 | 1 | |

[1] In order of elution from columns. Several exceedingly weak peaks have been omitted from this table.
[2] Quantities of components should be compared only within single colums, not between columns since the method of purification influenced ammonium salt content of the samples.
[3] Glutamic acid was detected.

In these spark experiments the distribution of α-amino acid residues in the product hydrolysates could be altered by varying the stoichiometry of methane and ammonia or by adding other reactants to the methane-ammonia mixture. The addition of toluene, for example, enabled phenylalanine to be detected in addition to the other eight α-amino acids. After 1.0 ml. of freshly distilled toluene was placed in the cycle apparatus of Example 1 and a 1:1 mixture of $CH_4$ and $NH_3$ was admitted as in Example 1, the mixture was sparked for 24 hrs., washed out with 6 N HCl, and hydrolyzed at 100° C. for 24 hrs. Hydrolysates were clarified with charcoal and analyzed by TLC on non-fluorescent plates. The presence of phenylalanine was established from comparative R$f$ values in solvents TLC I, TLC II, and TLC IV.

Thus, polymeric peptide precursors were synthesized spontaneously in the absence of water by applying electric discharges to dry mixtures of methane and ammonia. The polymers were converted to polypeptides by mild hydrolysis and to a mixture of at least eight of the common α-amino acids by strong hydrolysis. These results show that proteins could have evolved readily in the reducing environment of primitive earth and other planets without the intervening formation of α-amino acids.

The foregoing examples have been described in the above specification for the purpose of illustration and not limitation. Many other modifications and ramifications based on this disclosure will naturally suggest themselves to those skilled in the art. These are intended to be comprehended as within the scope of this invention.

Having thus described our invention, what we desire to claim and secure by Letters Patent is:

1. A process for making polypeptides comprising
   (a) subjecting under anhydrous conditions,
   (b) a gaseous mixture of methane and ammonia,
   (c) to a high energy radiation of an energy equivalent to at least 6 electron volts,
   (d) at a temperature of from about zero to about 300 degrees centigrade,
   (e) and a pressure of from about 500 millimeters of mercury to about 3 atmospheres,
   (f) for a period of about 24 to about 72 hours,
   (g) and then treating the resulting products with water under mild hydrolysis conditions which convert imino groups to carbonyl groups but do not cleave the peptide bonds.

2. The process of claim 1 wherein the energizing radiation is an electric spark discharge.

3. The process of claim 1 wherein the energizing radiation is ultraviolet light of wavelength less than 2000 angstrom units.

4. The process of claim 1 wherein the gaseous mixture of methane and ammonia additionally includes a reactant that yields free radicals which reactant is selected from the group which consists of an alkyl hydrocarbon and an aralkyl hydrocarbon whereby the resulting polypeptide contains side chains derived from the added reactant.

5. The process of claim 4 wherein the reactant that yields free radicals is an alkyl hydrocarbon having from about 2 to 12 carbon atoms.

6. The process of claim 4 wherein the reactant that yields free radicals is an aralkyl hydrocarbon having from about 7 to 18 carbon atoms.

7. The process of claim 4 wherein the reactant that yields free radicals is toluene.

References Cited

UNITED STATES PATENTS 2,956,938  10/1960  Vaughan _____ 204—162

BENJAMIN R. PADGETT, Primary Examiner

U.S. Cl. X.R.

204—165, 168